US008707355B2

(12) United States Patent
Cho et al.

(10) Patent No.: US 8,707,355 B2
(45) Date of Patent: Apr. 22, 2014

(54) METHOD AND DEVICE FOR DISPLAYING PROGRAM INFORMATION OF BROADCASTING

(75) Inventors: Min-Haeng Cho, Seongnam-si (KR);
Chang-Woo Lee, Seoul (KR);
Eun-Kyung Chang, Seongnam-si (KR)

(73) Assignee: Humax Co., Ltd., Seongnam-si (KR)

( * ) Notice: Subject to any disclaimer, the term of this patent is extended or adjusted under 35 U.S.C. 154(b) by 619 days.

(21) Appl. No.: 11/872,320

(22) Filed: Oct. 15, 2007

(65) Prior Publication Data

US 2008/0109847 A1 May 8, 2008

(30) Foreign Application Priority Data

Nov. 7, 2006 (KR) .................. 10-2006-0109478

(51) Int. Cl.
*G06F 3/00* (2006.01)
*G06F 13/00* (2006.01)
*H04N 5/445* (2011.01)

(52) U.S. Cl.
USPC .............................. 725/37; 715/700; 345/594

(58) Field of Classification Search
USPC ........... 725/39–59, 61, 68, 85, 100, 131, 139, 725/151; 715/700–867; 345/594
See application file for complete search history.

(56) References Cited

U.S. PATENT DOCUMENTS

| | | | | |
|---|---|---|---|---|
| 5,850,218 A | * | 12/1998 | LaJoie et al. | 725/45 |
| 6,323,911 B1 | * | 11/2001 | Schein et al. | 348/552 |
| 6,481,010 B2 | * | 11/2002 | Nishikawa et al. | 725/44 |
| 6,642,939 B1 | | 11/2003 | Vallone et al. | 345/721 |
| 7,065,777 B2 | * | 6/2006 | Inoue | 725/39 |
| 7,100,184 B1 | * | 8/2006 | Kahn | 725/39 |
| 2001/0016946 A1 | * | 8/2001 | Inoue | 725/44 |
| 2004/0233238 A1 | * | 11/2004 | Lahdesmaki | 345/810 |
| 2007/0083891 A1 | * | 4/2007 | Moon | 725/39 |

FOREIGN PATENT DOCUMENTS

| | | |
|---|---|---|
| EP | 1 199 887 A2 | 4/2002 |
| EP | 0 822 713 B1 | 6/2003 |
| EP | 1 521 459 A2 | 4/2005 |
| EP | 1 580 989 A1 | 9/2005 |
| WO | WO 95/32583 | 11/1995 |
| WO | WO 00/52929 | 9/2000 |

OTHER PUBLICATIONS

European Office Action and Search Report dated Aug. 28, 2008.
European Office Action dated Jul. 20, 2009.

* cited by examiner

*Primary Examiner* — Yassin Alata
(74) *Attorney, Agent, or Firm* — KED & Associates LLP

(57) ABSTRACT

A method of displaying an EPG and a device thereof. According to one aspect of embodiment of the present invention, the method of displaying the EPG (Electronic Program Guide) in a broadcasting electronic device displays an EPG default mode screen having a channel field and an event field in accordance with a user's manipulation of an EPG mode execution command key, adds a field of a predetermined item in accordance with an input signal corresponding to a display mode change key, and displays an EPG addition mode screen to display a specific value of the added field and event information corresponding to a preselected channel.

7 Claims, 4 Drawing Sheets

METHOD AND DEVICE FOR DISPLAYING PROGRAM INFORMATION OF BROADCASTING

CROSS-REFERENCE TO RELATED PATENT APPLICATIONS

This application claims the benefit of Korean Patent Application No. 10-2006-0109478, filed on Nov. 7, 2006, in the Korean Intellectual Property Office, the disclosure of which is incorporated herein in its entirety by reference.

BACKGROUND OF THE INVENTION

1. Field of the Invention

The present invention relates to display of information, more particularly to a method of and a device for displaying program information.

2. Description of the Related Technology

As a variety of broadcasting systems, such as the Internet broadcasting and satellite broadcasting as well as ground-wave broadcasting, are increasingly available, a broadcast receiver such as a set top box is used to receive broadcasting signals from a satellite and transmit the signals to a TV set.

A device having the set top box or a device for receiving and displaying a broadcasting program (e.g., a DMB (Digital Multimedia Broadcasting) phone, a digital TV, etc. Collectively, "broadcasting electronic device") provides an EPG (Electronic Program Guide) display function. The EPG is program information including event information such as the schedule or program title of a channel and channel information, and the broadcasting electronic device displays an EPG screen to provide the program information to a user. Of course, it is apparent that the EPG may be various program information such as channel information per each satellite or channel information per each broadcasting system as well as program information per each channel.

The EPG has been able to display information of 2- to 3-hour events only on one screen. If the user viewed one-week-long broadcasting program information and wanted to schedule the recording of desired programs, the conventional EPG would require several key pushes to view the event information based on the desired channel and day of the week. Namely, it was very uncomfortable for the user because the EPG screen was not provided with various conditions (e.g., channel or day) for searching broadcasting event information.

SUMMARY OF CERTAIN INVENTIVE ASPECTS

The present invention provides a method of and a device for displaying event information of each day of the week when an EPG display function is activated.

The present invention also provides a method of and a device for providing EPG screens in various modes according to various items such as the day of the week with simple key operations.

The present invention also provides a method of and a device for displaying an EPG screen, on which event information can be searched in various ways by inserting an information field with simple key operations.

An aspect of the present invention features a method and a recorded medium of a program of displaying an EPG (Electronic Program Guide) in a broadcasting electronic device. The method and program display an EPG default mode screen having a channel field and an event field according to the user's manipulation of an EPG mode execution command key, add a field of a predetermined item in accordance with an input signal corresponding to a display mode change key, and display an EPG addition mode screen to display a specific value of the added field and event information corresponding to a preselected channel.

In addition, a cursor is moved to one of the channel field and the added field or to one of the values of the fields in accordance with an input from the user.

The event information selected by the cursor or corresponding to predetermined values of each field is displayed on the event field.

Another aspect of the present invention features an EPG display device, which includes an input device having an EPG mode execution command key and a display mode change key, a display, displaying an EPG screen, and a controller, displaying on the display an EPG default mode screen having a channel field and an event field according to the user's manipulation of the EPG mode execution command key, adding a field of a predetermined item corresponding to an input signal of the display mode change key, and displaying on the display an EPG addition mode screen to display the added field and event information corresponding to a preselected channel.

In each of the aspects, the item may be a day of the week, and the value of the added day field can be initialized to "today."

In addition, the controller can move a cursor to one of the channel field and the added field or to one of the values of the fields in accordance with an input from the user, and the event information selected by the cursor or corresponding to predetermined values of each field can be displayed on the event field.

In addition, if the field of the item is added, the EPG screen can be displayed to locate the cursor on the preselected channel of the channel field.

In addition, if the input signal corresponding to the display mode change key is detected again, a field of another item in the predetermined order can be newly added, and event information corresponding to the newly-added field can be displayed.

In addition, the predetermined order can be configure by an operation of the user, and a user interface (UI) screen for the user to determine the order can be displayed.

In addition, the time axis of the event field included in the EPG addition mode screen can be displayed vertically.

Also, the EPG mode execution command key and the display mode change key can be embodied in a single key.

Still another aspect of the present invention features an EPG display device, which includes an input device having an EPG mode execution command key and a display mode change key, a display, displaying an EPG screen, and a controller displaying on the display an EPG screen having a channel field, a day field, and an event field in accordance with the user's EPG mode execution command key. A channel selected among the channel field and event information corresponding to the day selected among the day field are displayed in the event field.

DESCRIPTION OF CERTAIN INVENTIVE EMBODIMENTS

Figure 1:
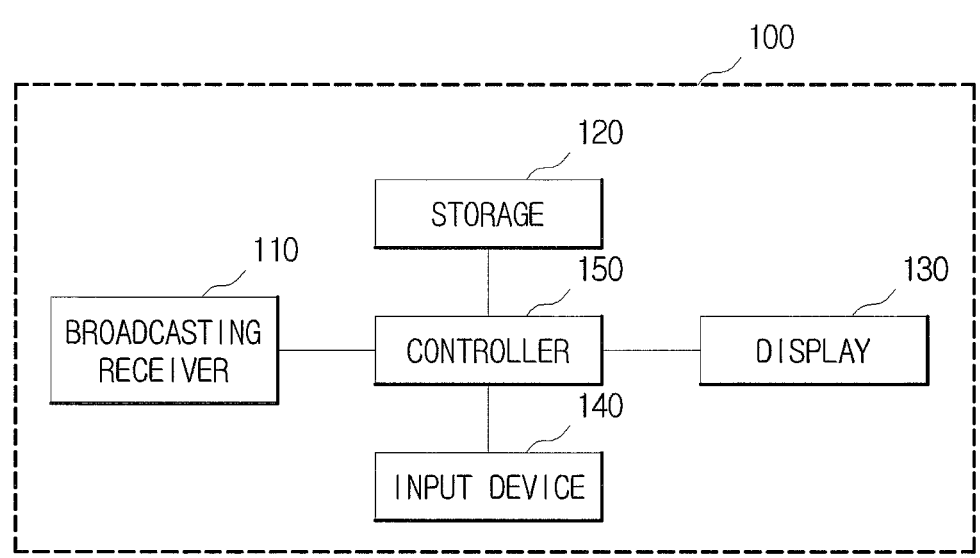
FIG. 1 is a block diagram of a broadcasting electronic device providing an EPG display function according to an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments will be described in detail with reference to the accompanying drawings. In describing the present invention, identical or corresponding elements will be given the same reference numerals, regardless of the figure number.

FIG. 1 is a block diagram of a broadcasting electronic device providing an EPG display function according to an embodiment of the present invention.

Referring to FIG. 1, the broadcasting electronic device 100, which is an EPG displaying device, includes a broadcasting receiver 110, a storage 120, a display 130, an input device 140, and a controller 150.

The input device 140 is for receiving an input signal, such as an EPG mode execution command, from a user, and can be a button, wheel, switch, or short-range communication module (e.g., a remote controller module for receiving a signal from a remote controller, Bluetooth, etc.).

Particularly, the input device 140 according to the present invention can also have a certain function key (hereinafter, "display mode change key") for changing into various types of EPG screens such as an EPG screen per each day of week. The display mode change key may be a dedicated key, or an EPG mode execution command key can be used as the display mode change key. Namely, if the EPG mode execution command key is pushed once, the EPG mode will run, and after a second push, it can work as the display mode change key. The way of changing the EPG screen by use of the display mode change key will be described with reference to FIG. 2 to FIG. 4.

The broadcasting receiver 110 receives broadcasting data and broadcasting event information from at least one broadcasting system, and the storage 120 stores the broadcasting event information received from the broadcasting system.

The controller 150 controls the broadcasting receiver 110, the storage 120, the input device 140 and the display 130 to receive the event information for each broadcasting from the broadcasting system, generate and display an EPG screen containing the broadcasting program information by use of the received broadcasting event information. In addition, the controller 150 controls each element to provide the EPG screen containing the broadcasting program information corresponding to a current channel and the day of the week according to an input of a certain function button in the input device 140.

Although not shown in the drawings, the controller 150 of the broadcasting electronic device 100 can include an input signal analyzer, memory, EPG function unit and display controller, and it is not required for each component of the controller 150 to be embodied in the form of hardware but it can be embodied in the form of software such as a program.

The input signal analyzer of controller 150 recognizes input signals received through the input device 140. Namely, the input signal analyzer recognizes the user's manipulation of the EPG mode execution command key and the display mode change key and sends the input signals corresponding to each manipulation to the controller 150.

The memory of the controller 150 can store data required for the controller to operate the aforementioned functions and, in addition, temporally store broadcasting program information such as event information per each channel required to generate the EPG screen.

The EPG function unit of the controller 150 generates the EPG screen by using information about a broadcasting program received from a broadcasting system. In addition, the EPG function unit generates EPG screens of various modes according to the display mode change key as described above.

The display controller of the controller 150 controls the display 130. Namely, the display controller controls the display to display an EPG screen generated by the EPG function unit.

Hereinafter, a method of displaying an EPG in a broadcasting electronic device 100 having a display mode change key will be described. Other functions for having each element of the broadcasting electronic device 100 display an EPG screen will become more apparent from the following description.

Figure 2:
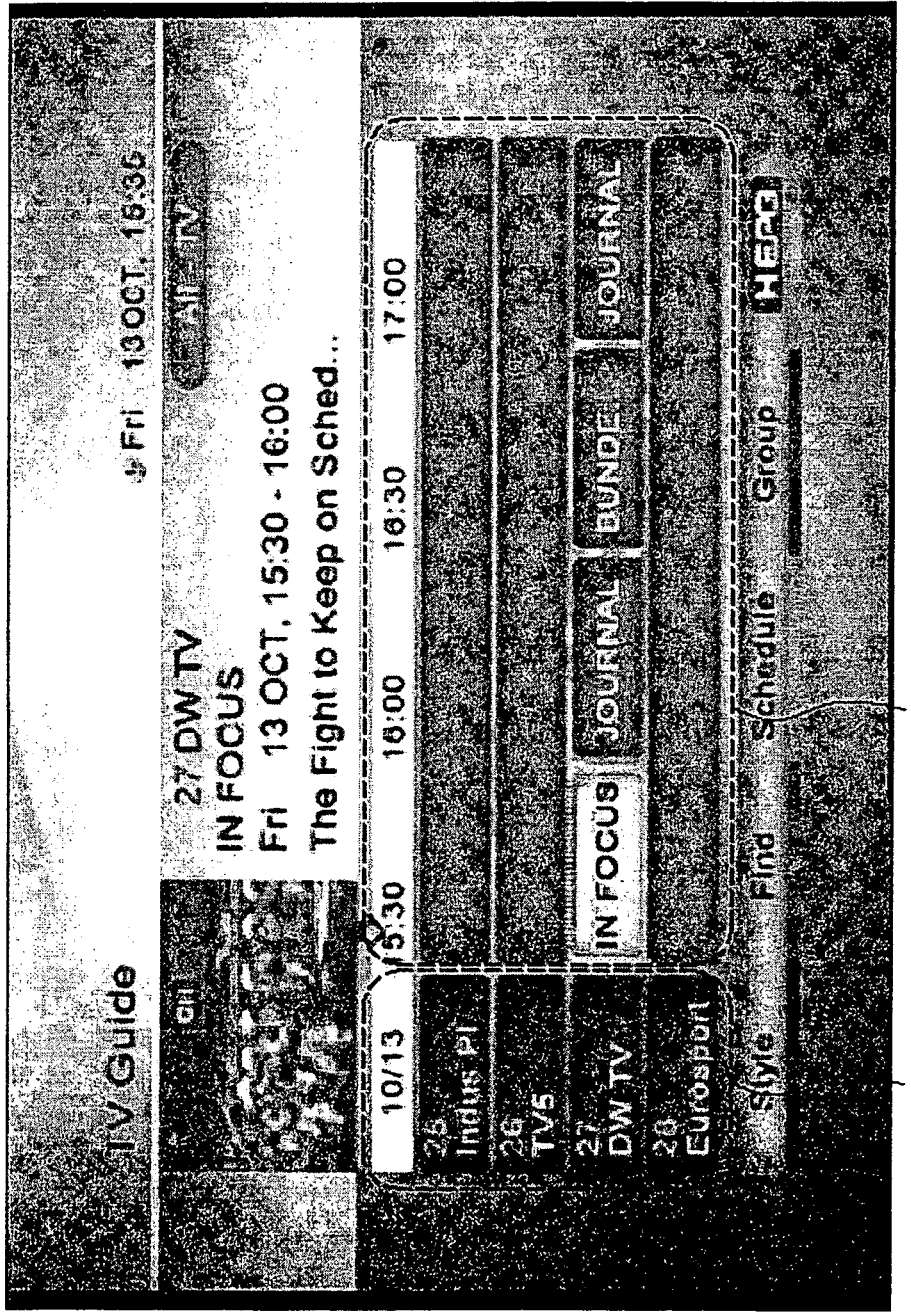
FIG. 2 is an EPG default mode screen according to an embodiment of the present invention.
Figure 3:
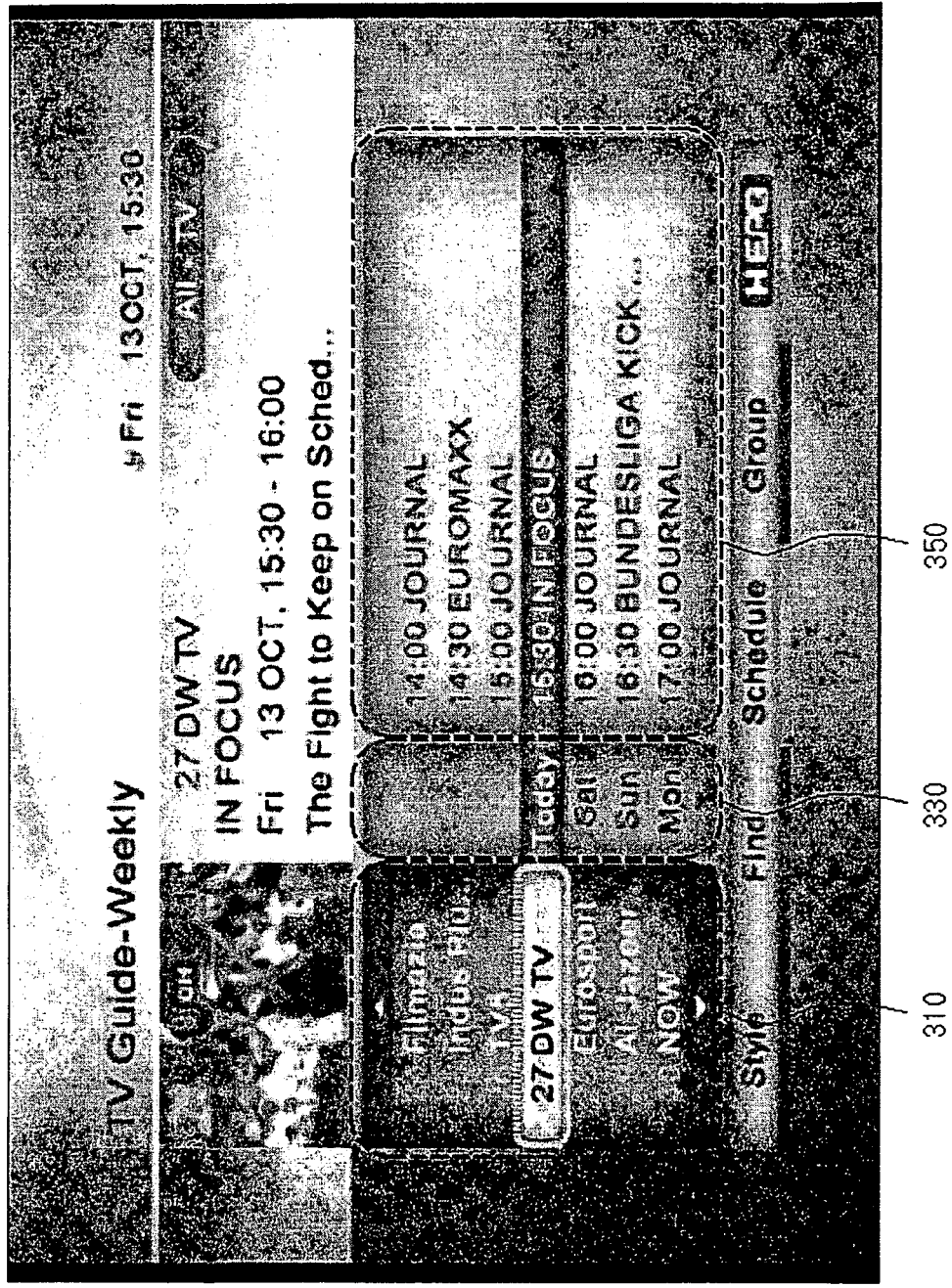
FIG. 3 and FIG. 4 are an EPG weekly mode screen according to each embodiment of the present invention.
Figure 4:
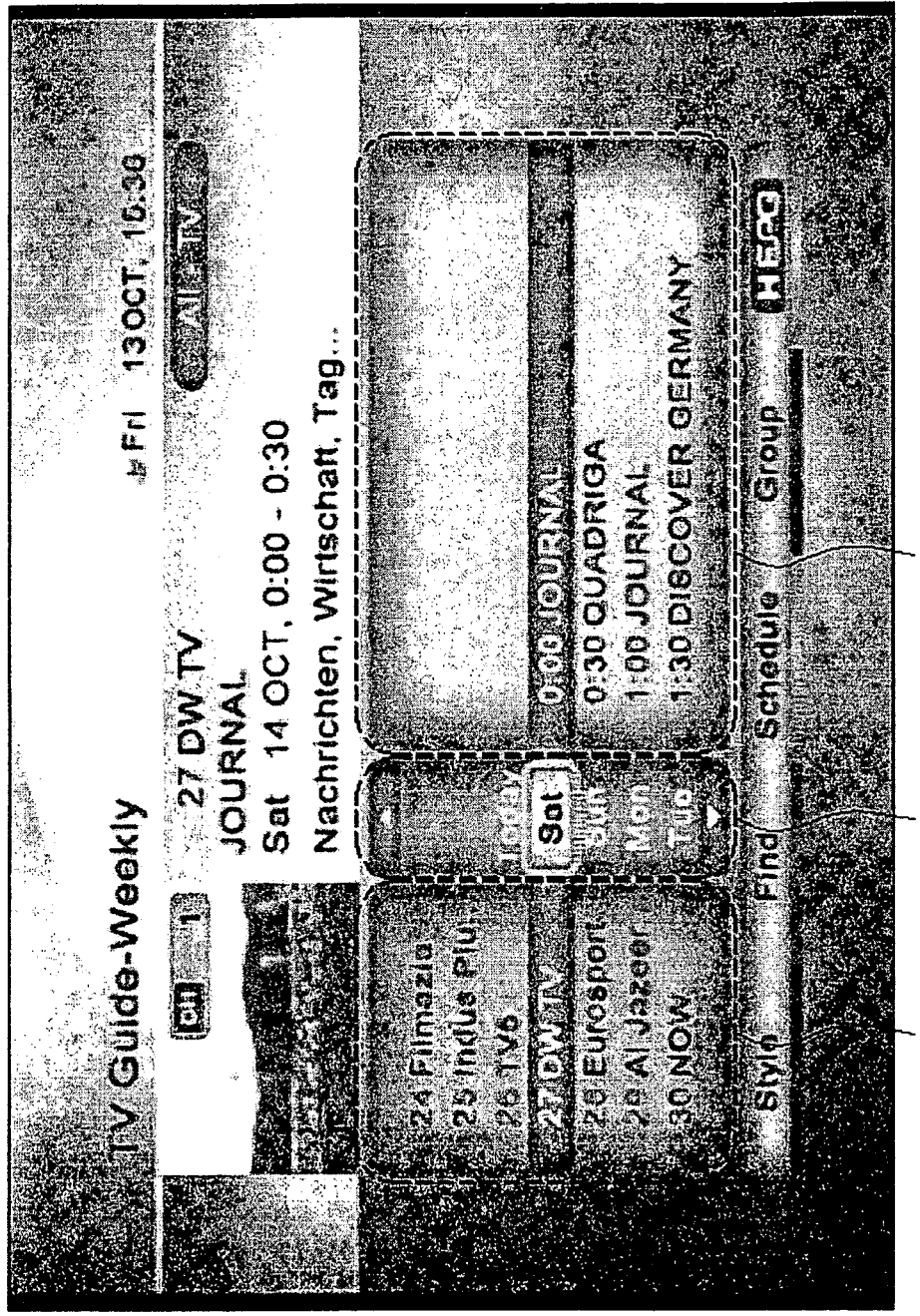

FIG. 2 is an EPG default mode screen according to an embodiment of the present invention, and FIG. 3 and FIG. 4 are an EPG weekly mode screen according to each embodiment of the present invention.

Once a signal corresponding to the EPG mode execution command key is inputted, the broadcasting electronic device 100 can display "EPG default mode screen" as shown in FIG. 2.

On the EPG default mode screen, event information (i.e., program information on the channel and time) is displayed in the order of channel and time. The EPG default mode screen includes a channel field 210, with information on the channel, and an event field 230, with event information on the time table. On the channel field 210, the predetermined number of channels is displayed for the user to select the desired channel, and on the event field 230, event information corresponding to the selected channel is displayed on each time table.

If there is an input of the display mode change key, "EPG addition mode screen", added with one more field corresponding to an item according to the predetermined order, is displayed. Hereinafter, as shown in FIG. 3 and FIG. 4, it will be assumed that the item corresponding to the first manipulation of the display mode change key is the day of the week, and accordingly, "EPG weekly mode screen" to which a day field 330 is added is displayed. Of course, various types of modes, such as a broadcasting type field (e.g., a fields having items such as sports, entertainment, news, etc.) as well as a day field 330 may be added at the beginning. For example, the predetermined order can be the day of the week, the broadcasting type, the broadcasting schedule, etc., and it is apparent that any field for various items can be added to this order.

In addition, according to an embodiment, the broadcasting electronic device 100 can provide a UI screen for the user to set the order of items to be added. Thus, the user can preconfigure the order of items to be added and then add a field for each item on the EPG screen.

The EPG weekly mode screen includes a channel field 310 for displaying a channel, a day field 330 for displaying the day of the week, and an event field 350 for displaying event information based on the time table. The time period (e.g., 6 hours) displayed on the event field 350 is adjustable by the user. Of course, it is apparent that the time and event information can be separated such that the time field can be located separately. Namely, by the user's selection of a certain time in the time field, the event information at the selected time can be displayed on the event field 350.

As shown in the drawings, in order to be suitable for the user's order of cognition, the channel field 310, day field 330, and event field 350 can be arranged from the left to the right. Of course, it is apparent that the arrangement order may be changed.

The event information (i.e., an "AND" operation of the channel and the day of the week) corresponding to one channel selected from the channel field 310 and the day selected from the day field 330 is displayed on the event field 350. If a cursor is located on the channel field 310, the user can see the event information corresponding to the day by selecting the desired channel through a navigation key (up-down-left-right arrows) and so on. The cursor can have any kinds of shapes to allow the user to select any one value within the field. For example, as shown in FIG. 3, a box type cursor can be displayed for the user to recognize that "27 DW TV" in the channel field 310 is selected.

In addition, when the user moves the cursor in the same way of using the navigation key to select the desired day of the week while a certain channel is selected, the user can view the selected day of the week and event information corresponding to the channel on the event field 350.

Therefore, according to the present invention, the user can easily view the desired day and event information corresponding to the channel by a single key manipulation for displaying the EPG screen having the day field 330 added thereon.

As shown in the drawings, if the EPG default mode screen is changed to the EPG weekly mode screen in order to increase the amount of information to be displayed on the broadcasting electronic device 100, the time axis may be changed from the horizontal axis to the vertical axis.

In another embodiment, directly after a signal corresponding to the EPG mode execution command key is inputted at first, the broadcasting electronic device 100 can display the EPG weekly mode screen as shown in FIG. 3 or FIG. 4. Thus, if executing an EPG function, the user can search channel and event information according to the day of the week by selecting the channel and day of the week. Of course, it is apparent from the aforementioned description that a broadcasting type field can be added if a signal corresponding to the display mode change key is inputted.

Referring to FIG. 3, if an input signal for the display mode change key is inputted once while displaying the EPG default mode screen, the broadcasting electronic device 100 displays the EPG weekly mode screen and locates the cursor on the channel field 310. Namely, by locating the cursor on the channel being selected on the EPG default mode screen, the channel on which the cursor is located and event information of the initialized day of the week are displayed. The day of the week can be initialized to the present day, i.e., "Today."

Thus the user can view the event information of the desired channel on the currently selected day of the week by operating the movement of cursor located on the channel field 310.

According to an embodiment, if an input signal corresponding to a predetermined key such as a certain direction button is inputted, the cursor can be moved to the day field 330. Namely, after locating the cursor to the day field 330 by pushing a right direction button, the user can select the desired day by manipulating the up or down direction button, and the broadcasting electronic device 100 can extract the selected day and event information corresponding to the preselected current channel and displays them on the event field 350.

As described above, if the display mode change key is pushed again on the EPG weekly mode screen, the broadcasting electronic device 100 can add another field (e.g., the aforementioned broadcasting type field, etc.) according to the predetermined order, and accordingly the event information corresponding to the broadcasting type field added to the event field 350 can be displayed.

Of course, as shown in the drawings, it is apparent that the current time, date, day of the week and details of the currently selected channel and event can be further displayed on the EPG screen.

The aforementioned method according to the embodiment of the present invention can be stored in a computer-readable recorded medium (e.g. CD-ROM, RAM, ROM, floppy disc, hard disc, optical disc, etc) in the form of a program.

Although the present invention is described with some embodiments, those who skilled in the art can understand that various modifications, changes, and additions can be made without departing from the mete and scope of the present invention.

What is claimed is:

1. A method of displaying an Electronic Program Guide (EPG) in a broadcasting electronic device, comprising:

in response to receiving a first input of a single key, initially displaying, on a display, an EPG mode screen that includes a channel field and an event field;

in response to receiving a second input of the single key, determining a first new field based on a previously stored order of fields and changing the previously displayed screen to display the first new field between the channel field and the event field, wherein the determined first new field is a first field in the previously stored order of fields, and the determined first new field is a day field, and wherein the day field is displayed between the channel field and the event field in response to the second input of the single key, and wherein the second input of the single key is after the first input of the single key;

displaying a cursor on a preselected channel of the channel field, after displaying the day field;

selecting a desired channel of the channel field and a desired day on the day field by moving the cursor based on an up-down-left-right-navigation key;

extracting event information corresponding to the selected day and the selected current channel;

displaying the event information on the event field according to the selected day and the selected current channel; and in response to receiving a third input of the single key, determining a second new field based on the previously stored order of fields and changing the previously displayed screen to display the second new field, the channel field and the event field, wherein the determined second new field is a second field after the first field in the previously stored order of fields, and wherein the third input of the single key is after the second input of the single key, and the second new field is a different field from the first new field, wherein in response to receiving the first input of the single key, the event field is displayed with a time axis in a horizontal direction, and in response to receiving the second input of the single key, the event field is changed to display a time axis in a vertical direction, and wherein the second new field is a broadcast type field.

2. The method of claim 1, further comprising moving a cursor to anyone of the channel field and the day field or to anyone of the values of the fields in accordance with an input from the user, wherein the event information selected by a cursor or corresponding to predetermined values of the fields is displayed in the event field.

3. The method of claim 1, wherein a predetermined order of a plurality of items is configured by an operation of the user.

4. An Electronic Program Guide (EPG) display device, comprising:
- a memory to store the order of fields;
- an input device having an EPG mode execution command key and a display mode change key;
- a display to display generated EPG screens; and
- a controller being adapted to execute the method of claim 1.

5. The EPG display device of claim 4, wherein the controller controls the display to display a user interface CUI) screen for the user to input a specific order of the order of fields.

6. The method of claim 1, wherein the event information further corresponding to the added new field is displayed on the event field.

7. The method of claim 1, further comprising preparing the order of fields, and storing the order of fields.

* * * * *